United States Patent
Yang

(10) Patent No.: US 7,802,720 B2
(45) Date of Patent: Sep. 28, 2010

(54) METHOD AND SYSTEM FOR PERFORMING A CARD-PRESENT TRANSACTION USING IMAGE CAPTURE ON A PORTABLE DEVICE

(75) Inventor: Barbara Jer-Chee Yang, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 457 days.

(21) Appl. No.: 11/969,592

(22) Filed: Jan. 4, 2008

(65) Prior Publication Data

US 2009/0173784 A1    Jul. 9, 2009

(51) Int. Cl.
*G06K 5/00* (2006.01)
(52) U.S. Cl. .................................. 235/380
(58) Field of Classification Search ............ 235/379, 235/380; 705/35
See application file for complete search history.

(56) References Cited

U.S. PATENT DOCUMENTS

| 7,543,737 B2* | 6/2009 | Bensimon et al. ........... 235/380 |
| 2006/0097045 A1* | 5/2006 | Tsutsui et al. ................ 235/383 |
| 2007/0000998 A1* | 1/2007 | Lu et al. ...................... 235/380 |

* cited by examiner

*Primary Examiner*—Seung H Lee
(74) *Attorney, Agent, or Firm*—Park, Vaughan & Fleming, LLP; Chia-Hsin Suen

(57) ABSTRACT

Some embodiments of the present invention provide a system that processes a financial transaction involving a portable device and a transaction server. During operation, the system obtains transaction data associated with the financial transaction that includes a transaction amount, credit card information, and an image of a credit card. The system then sends the transaction data to the transaction server using the portable device. Next, the system verifies a card-present transaction using the transaction data and determines a validity of the transaction data. If the transaction data is valid, the transaction server processes the financial transaction and sends an authorization code confirming the financial transaction to the portable device.

25 Claims, 8 Drawing Sheets

METHOD AND SYSTEM FOR PERFORMING A CARD-PRESENT TRANSACTION USING IMAGE CAPTURE ON A PORTABLE DEVICE

RELATED ART

Credit cards may be used in financial transactions between a variety of individuals, businesses, and organizations. For example, credit cards may be used to purchase goods or services, pay for business expenses, borrow money, and/or donate money to a charitable organization. In addition, credit card transactions may be conducted using various methods. Specifically, credit card information may be acquired by swiping the credit card at a terminal, manually entering the credit card information, and/or sending the credit card information through a telecommunications network, such as the Internet.

Businesses and/or merchants may encounter various difficulties and costs in processing credit card payments. For example, merchant service providers and/or payment processors often charge fees for processing credit card payments on the merchants' behalf. In addition, the fees may vary based on the nature of the transaction. More specifically, merchants are typically charged higher fees for card-not-present transactions than for card-present transactions. However, current credit card processing methods require card-present transactions to be established and/or verified using additional equipment, such as mobile swipe terminals or swipe readers.

For merchants who accept credit card payments in the field, such equipment may be impractical or undesirable. Mobile phone and/or laptop peripheral devices for processing card-present transactions are typically bulky and difficult to carry in the field. Additionally, each peripheral device may cost hundreds to thousands of dollars. Consequently, costs involved in purchasing a peripheral device need to be offset by processing a large number of transactions using the peripheral device. Completing such large numbers of transactions may be difficult or impossible for the merchant if multiple peripheral devices are required to provide credit card services to customers or a large proportion of credit card transactions are not processed in the field. As a result, merchants operating in the field may have to choose between higher non-card-present processing rates and expensive, bulky card-swiping equipment.

SUMMARY

Some embodiments of the present invention provide a system that processes a financial transaction involving a portable device and a transaction server. During operation, the system obtains transaction data associated with the financial transaction that includes a transaction amount, credit card information, and an image of a credit card. The system then sends the transaction data to the transaction server using the portable device. Next, the system verifies a card-present transaction using the transaction data and determines a validity of the transaction data. If the transaction data is valid, the transaction server processes the financial transaction and sends an authorization code confirming the financial transaction to the portable device.

In some embodiments, the system also includes an accounting system that obtains a record of the financial transaction from the transaction server.

In some embodiments, the transaction amount and credit card information are manually entered into the portable device.

In some embodiments, the credit card information is obtained by performing optical character recognition (OCR) on a front image and a back image of the credit card.

In some embodiments, the credit card information includes a credit card number, an expiration date, and a verification number.

In some embodiments, the credit card information also includes a postal code.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

In general, embodiments of the invention provide a method and system for processing credit card transactions. More specifically, embodiments of the invention provide a method and system for performing card-present credit card transactions using a portable device, such as a laptop computer or mobile phone. In one or more embodiments of the invention, hardware and software components native to the portable device are used to establish and perform card-present transactions. As a result, the portable device may be used by a merchant in the field to process credit card transactions without the drawbacks of additional peripheral devices or higher non-card-present fees.

Figure 1:
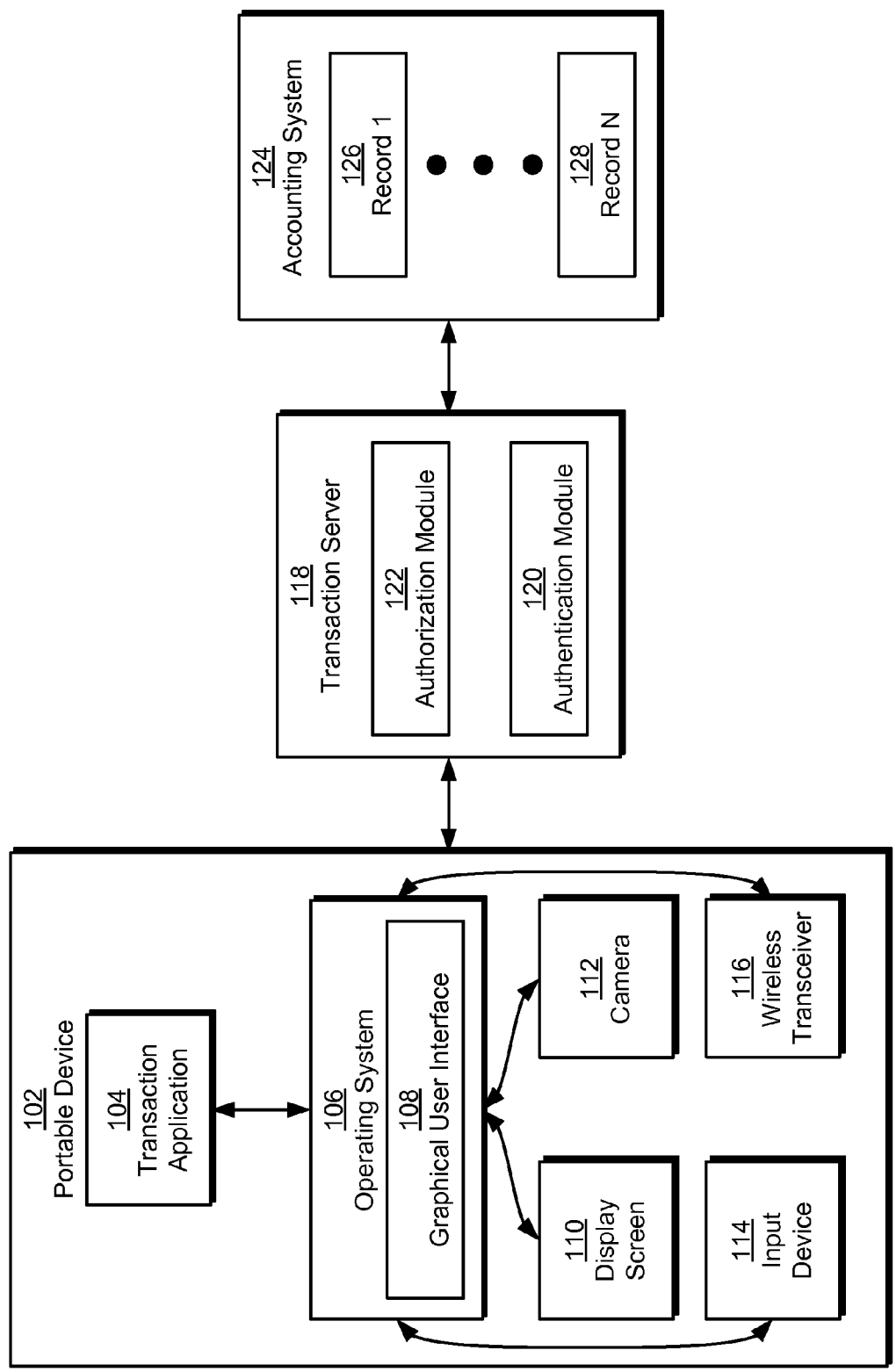
FIG. 1 shows a schematic of a portable device in accordance with an embodiment of the present invention.

FIG. 1 shows a schematic of a system in accordance with an embodiment of the present invention. As shown in FIG. 1, the system includes a portable device 102, a transaction server 118, and an accounting system 124. Each of these components is described in further detail below.

Portable device 102 may correspond to a portable electronic device that provides one or more services or functions to a user. For example, portable device 102 may operate as a mobile phone, portable computer, global positioning system (GPS) receiver, portable media player, and/or graphing calculator. In addition, portable device 102 may include an operating system 106 that coordinates the use of hardware and software resources on portable device 102, as well as one or more applications (e.g., transaction application 104) that perform specialized tasks for the user. For example, portable device 102 may include applications such as an email client, an address book, a document editor, and/or a media player. To perform tasks for the user, applications may obtain access to hardware resources (e.g., processor, memory, I/O components, etc.) on portable device 102 from operating system 106. Applications may also interact with the user through a hardware and/or software framework provided by operating system 106, as is described below.

To enable interaction with the user, portable device 102 may include one or more hardware input/output (I/O) components, such as display screen 110, camera 112, input device 114, and wireless transceiver 116. Each hardware I/O component may additionally be associated with a software driver (not shown) that allows operating system 106 and/or applications on portable device 102 to access and use the hardware I/O components.

Display screen 110 may be used to display images and/or text to one or more users of portable device 102. In one or more embodiments of the invention, display screen 110 serves as the primary hardware output component for portable device 102. For example, display screen 110 may allow the user(s) to view menus, icons, windows, emails, websites, videos, pictures, maps, documents, and/or other components of a graphical user interface (GUI) 108 provided by operating system 106. Those skilled in the art will appreciate that display screen 110 may incorporate various types of display technology to render and display images. For example, display screen 110 may be a liquid crystal display (LCD), an organic light-emitting diode (OLED) display, a surface-conducting electron-emitter display (SED), and/or other type of electronic display.

Input device 114 may function as the primary hardware input component of portable device 102. Specifically, input device 114 may allow the user to point to and/or select one or more areas of display screen 110 using a cursor, highlight, and/or other visual indicator. Input provided by the user using input device 114 may be processed by the corresponding software driver and sent to operating system 106 and/or one or more applications (e.g., transaction application 104) as one or more actions.

Input device 114 may receive user input through various methods, including touchscreens, touchpads, buttons, voice recognition, keypads, keyboards, and/or other input methods. In addition, multiple input devices may exist on portable device 102. Operating system 106 and/or applications on portable device 102 may use the input from the input device(s) to perform one or more tasks, as well as update GUI 108 in response. Images corresponding to GUI 108 may be sent by operating system 106 to a screen driver (not shown), which may display the images on display screen 110 as a series of pixels. As a result, the user may interact with portable device 102 by using input device 114 to provide input to operating system 106 and/or applications and receiving output from operating system 106 and/or applications through display screen 110.

Camera 112 may allow the user to capture images using portable device 102. For example, camera 112 may correspond to a mobile phone camera or a webcam on a laptop computer. Camera 112 may also record still and/or video images using a lens and digital image sensor. The images recorded by camera 112 may additionally be stored in a file system (not shown) of portable device 102 and used by one or more applications (e.g., transaction application 104). In one or more embodiments of the invention, images taken by camera 112 are used for record-keeping and/or verification purposes, as explained below.

Wireless transceiver 116 may allow portable device 102 to connect to one or more wireless networks, such as wireless local area networks (LANs) and/or mobile devices networks. Portable device 102 may also communicate with one or more locations on the network(s) by sending and/or receiving data over the network(s) using wireless transceiver 116. For example, portable device 102 may use wireless transceiver 116 to retrieve web pages, make calls, download and upload files, and send and receive emails over the network(s).

In one or more embodiments of the invention, portable device 102 includes functionality to process financial transactions. Specifically, portable device 102 may include functionality to process credit card transactions. In addition, various hardware and software components within portable device 102 may be used to establish and process card-present transactions. As a result, a merchant may use portable device 102 to perform credit card transactions without additional equipment costs or non-card-present fees.

As shown in FIG. 1, portable device 102 includes a transaction application 104. In one or more embodiments of the invention, transaction application 104 obtains transaction data associated with a financial transaction and enables the financial transaction to be processed using the transaction data. In one or more embodiments of the invention, the transaction data includes a transaction amount and credit card information from a credit card with which the financial transaction is processed. The credit card information may further include a credit card number, an expiration date, a verification number, and optionally, a Zone Improvement Plan (ZIP) or postal code.

To establish a card-present transaction, transaction application 104 may additionally obtain one or more images of the credit card associated with the financial transaction, which may be physically supplied to the merchant upon initiation of the transaction. In one or more embodiments of the invention, the image(s) of the credit card are captured by camera 112 and sent to transaction application 104. In addition, the images may also include a front image of the credit card and/or a back image of the credit card.

In one or more embodiments of the invention, the transaction amount and credit card information are manually entered into portable device 102 by the user. For example, the user may enter the transaction amount, credit card number, expiration date, verification number, and/or ZIP code into one or more form fields provided by transaction application 104 using input device 114. The user may then review the entered data using display screen 110. The user may also examine the image(s) of the credit card to verify the accuracy of the data entered.

Alternatively, some or all of the credit card information may be obtained automatically from the front image and/or back image of the credit card. In one or more embodiments of the invention, credit card information is obtained in part or whole by performing optical character recognition (OCR) on the image(s) of the credit card. If credit card information is manually entered by the user, transaction application 104 may use OCR technology to compare the manually entered information with the information extracted by OCR. The results of the comparison may then be reported to the user before the transaction is processed.

Once collected and/or reviewed, the transaction amount, credit card information, and credit card image(s) may be sent by transaction application 104 to transaction server 118 using wireless transceiver 116. An authentication module 120 within transaction server 118 may then establish the card-present transaction using the credit card image(s) and/or timestamps of the images and verify a validity of the transaction using the transaction data. For example, authentication module 120 may verify valid credit card information by comparing the credit card information with credit card account entries in a database. Authentication module 120 may also compare the credit card information with the images to ensure that the credit card information is accurately entered. Those skilled in the art will appreciate that OCR technology may be used by transaction application 104, authentication module 120, or both to obtain credit card information and/or verify the validity of the credit card information.

If the transaction data is invalid, authentication module 120 may generate an error message that is sent to portable device 102. In one or more embodiments of the invention, the error message corresponds to an invalid attribute of the financial transaction. For example, an incorrectly entered expiration date may prompt an error message explaining the invalid expiration date. The error message may be received by transaction application 104 using wireless transceiver 116, and the user may be prompted to re-enter the expiration date, which is sent to authentication module 120 for a second round of verification.

Once the transaction data is deemed valid by authentication module 120, the transaction is processed by authorization module 122 using the transaction amount and credit card information. Authorization module 122 may also generate an authorization number, which is sent to portable device 102 as confirmation of the financial transaction. Transaction server 118 may include additional functions, such as methods for sending a receipt to a customer of the transaction or for maintaining records of financial transactions and/or credit card accounts.

Moreover, a record (e.g., record 1 126, record N 128) of the financial transaction may be sent to accounting system 124. In one or more embodiments of the invention, accounting system 124 may be used by the merchant to keep track of financial accounts and/or transactions. As a result, accounting system 124 may keep track of financial transactions performed using portable device 102 by obtaining the transaction amounts and any other information (e.g., authorization codes, transaction dates, etc.) from transaction server 118. Records on accounting system 124 may be accessed and/or reviewed by the merchant using portable device 102 and/or another device (e.g., a desktop computer) on the network.

Figure 2A:
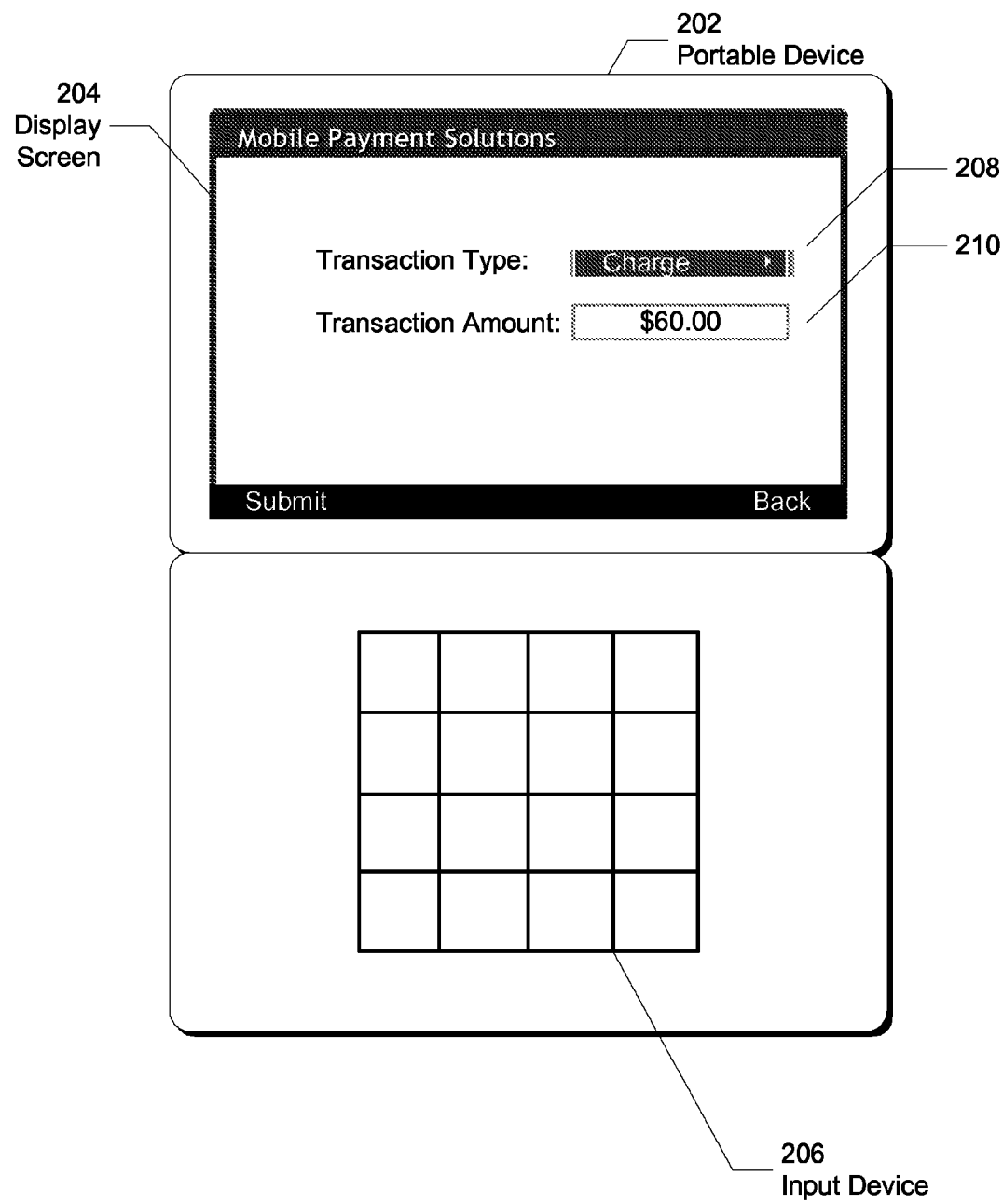
FIGS. 2A-2E show exemplary screenshots in accordance with an embodiment of the present invention.

FIG. 2A shows an exemplary screenshot of transaction data entry in accordance with an embodiment of the present invention. The screenshot is shown on a display screen 204 of a portable device 202. In addition, portable device 202 includes an input device 206 that enables the user to enter the transaction data into portable device 202. As shown in FIG. 2A, the transaction data includes a transaction type 208 and a transaction amount 210. Specifically, the screenshot shows a charge of $60.00 associated with the credit card transaction. The user may also select other transaction types, such as refunds, if applicable. As described above, additional transaction data, such as a credit card number, expiration date, verification number, and/or ZIP or postal code, may also be entered by the user into portable device 202 and/or obtained using OCR.

Figure 2B:
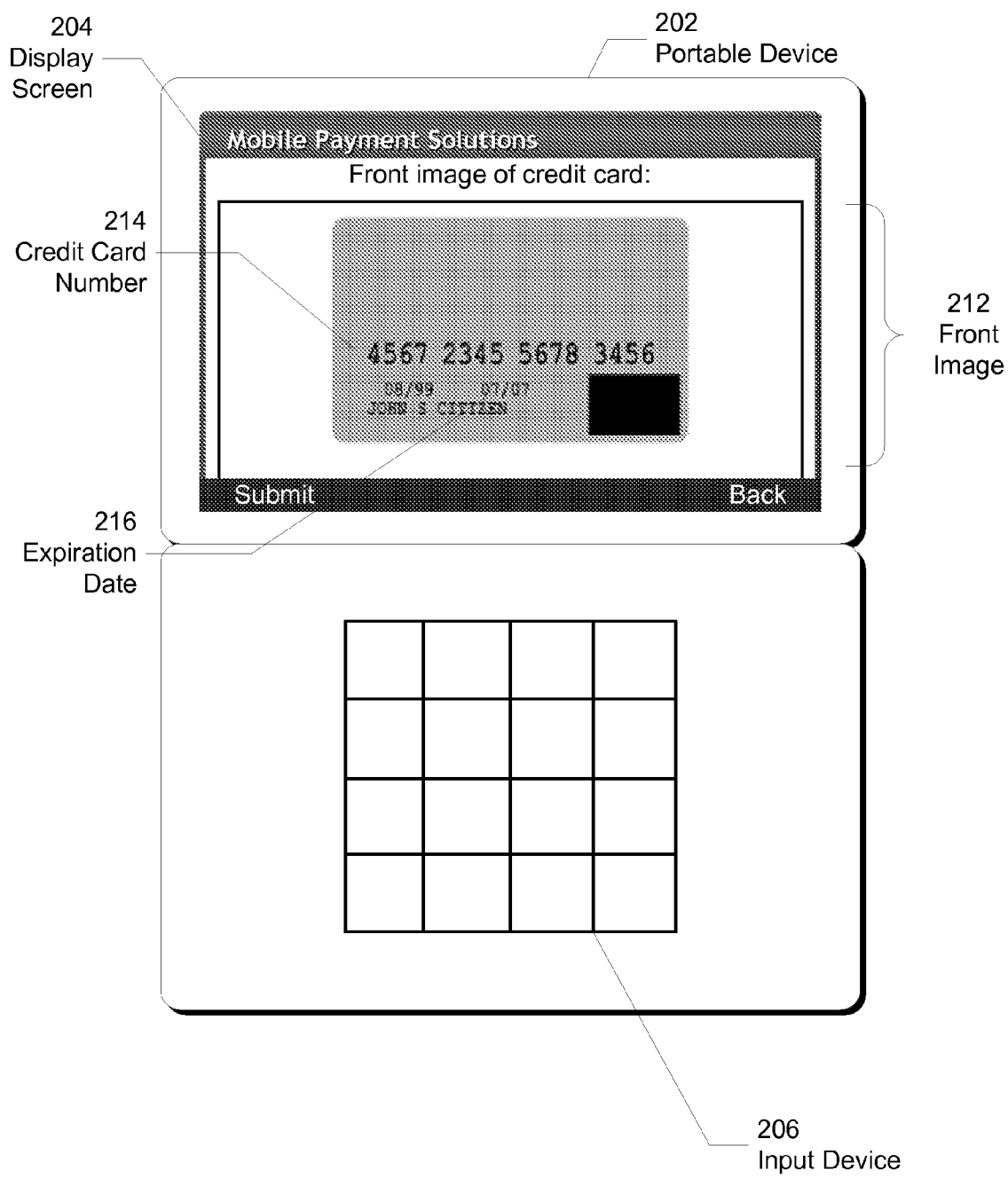

FIG. 2B shows an exemplary screenshot of credit card image capture in accordance with an embodiment of the present invention. As mentioned above, a camera (not shown) on portable device 202 may be used to capture a front image 212 and/or a back image of the credit card. Front image 212 is shown on display screen 204 after the image is captured by the camera. In addition, front image 212 shows the credit card with a credit card number 214 and expiration date 216 clearly visible. Those skilled in the art will appreciate that other guidelines (e.g., orientation, image size, focus, object distance, etc.) may apply with respect to obtaining and/or verifying credit card information from front image 212. As mentioned above, credit card number 214 and expiration date 216 may be verified by comparing data entered by the user to front image 212 and/or by performing OCR on front image 212.

Figure 2C:
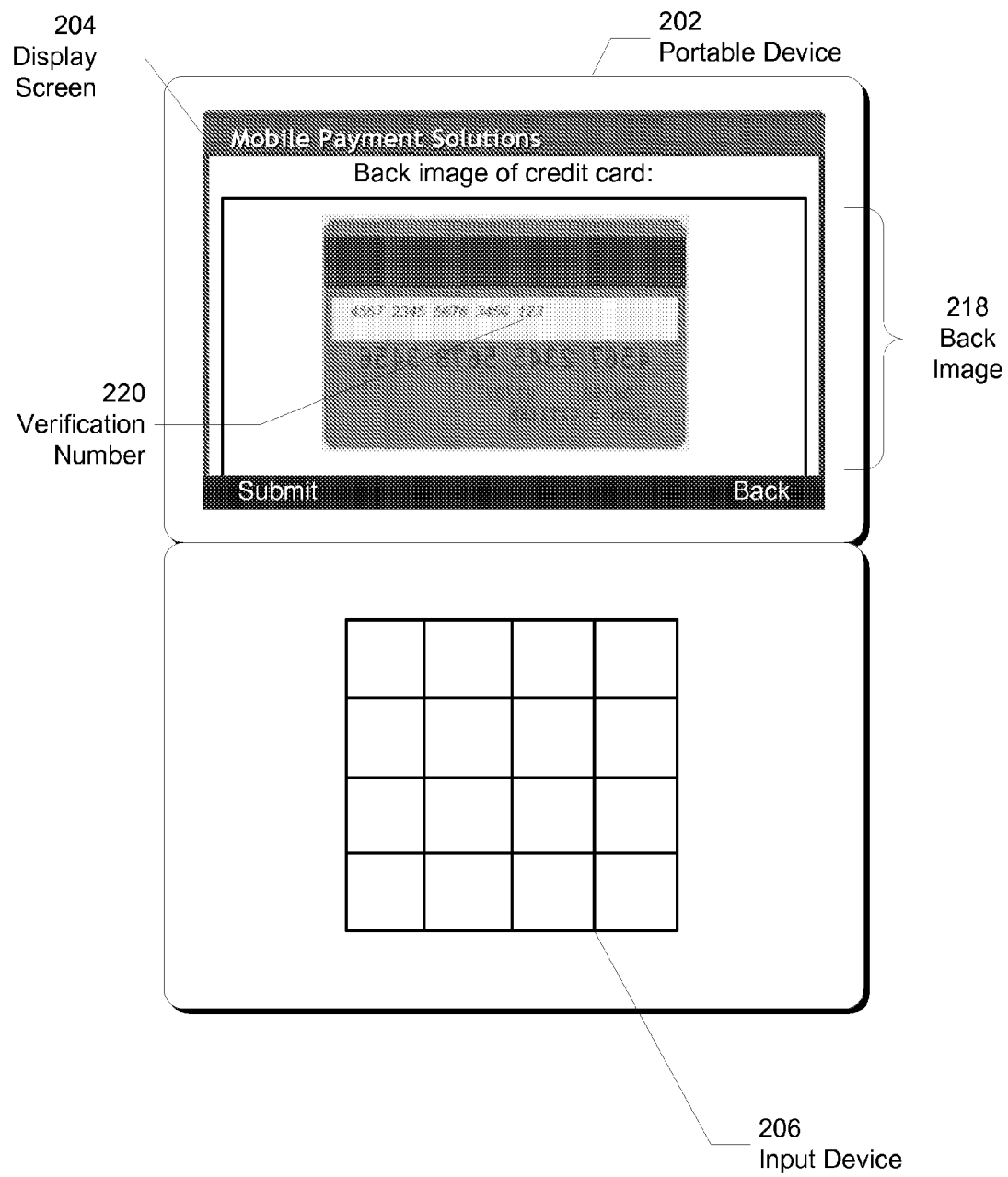

FIG. 2C shows an exemplary screenshot of credit card image capture in accordance with an embodiment of the present invention. Specifically, FIG. 2C shows a back image 218 of the credit card captured by the camera on portable device 202. As with the front image, back image 218 contains a verification number 220, which is clearly displayed. As with information on the front image, verification number 220 is used to process the credit card transaction and may be compared with a user-entered verification number or obtained using OCR on back image 218.

Figure 2D:
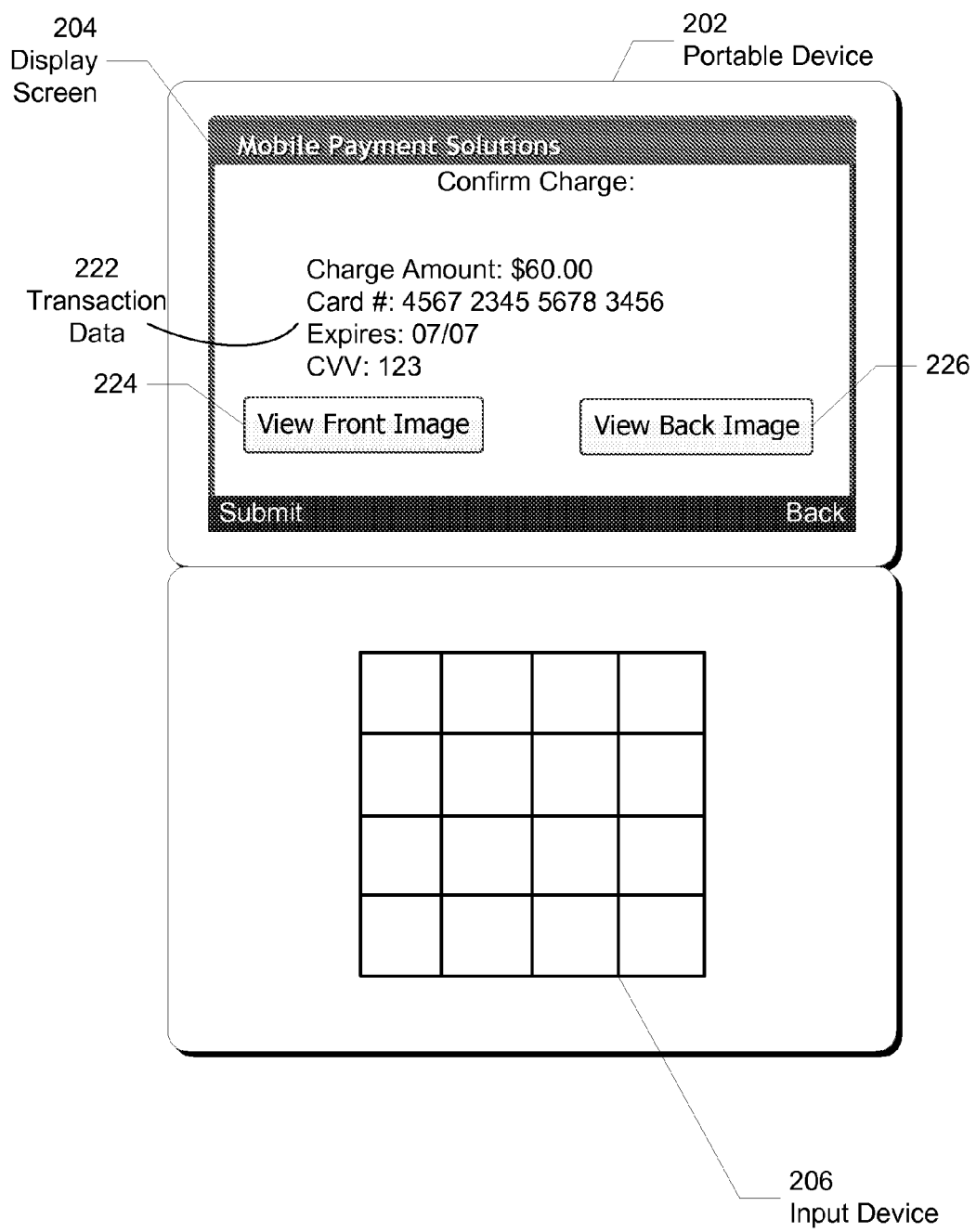

FIG. 2D shows an exemplary screenshot of transaction data review in accordance with an embodiment of the present invention. Transaction data 222 includes the charge amount, credit card number, expiration date, and verification number. The user may also select buttons for reviewing the front image 224 and back image 226 of the credit card shown in FIGS. 2B and 2C, respectively. If any errors are found in the transaction data and/or images, the user may go back to earlier screens and re-enter the data. Otherwise, the user may submit transaction data 222 for processing by a transaction server, such as transaction server 118 of FIG. 1.

Figure 2E:
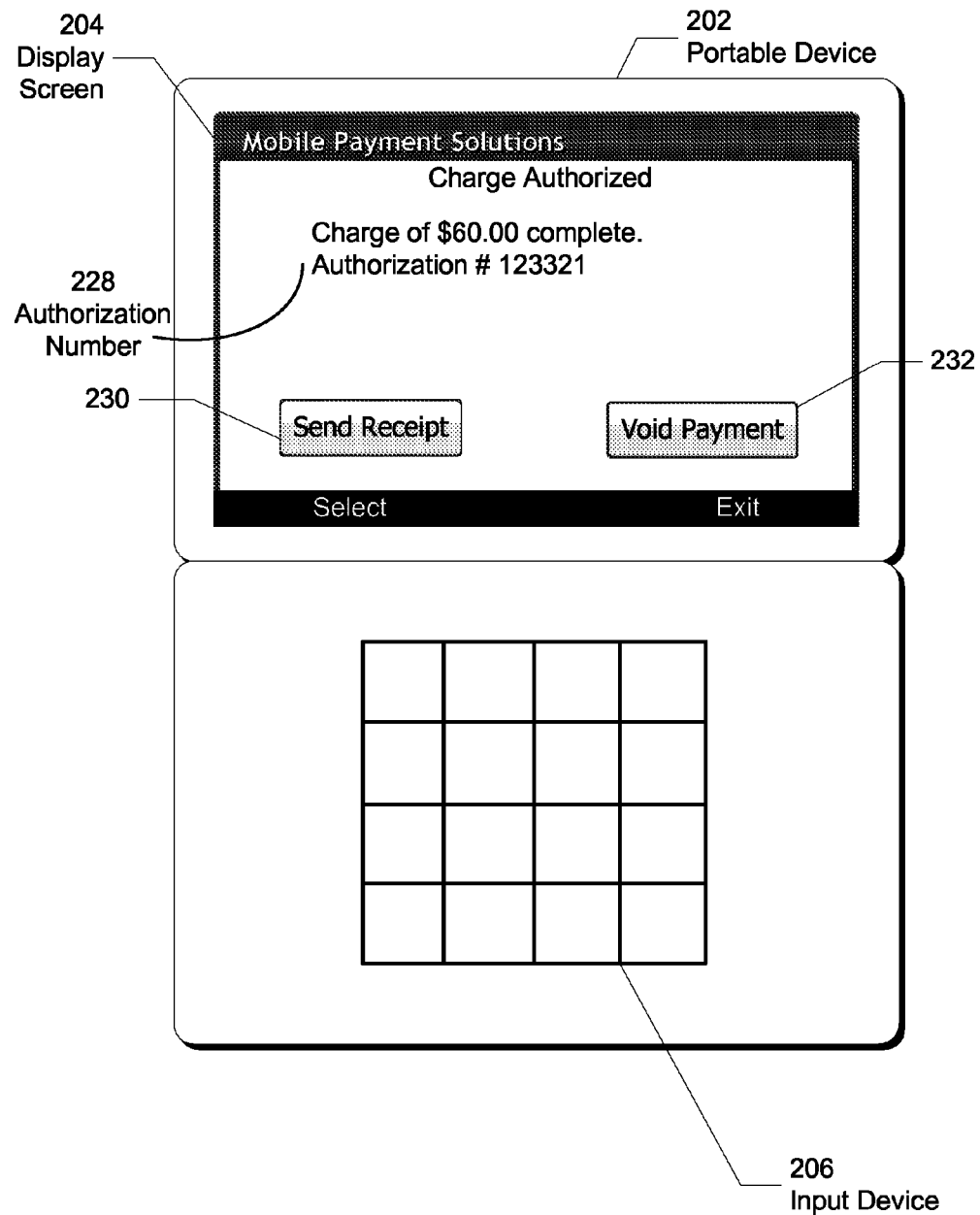

FIG. 2E shows an exemplary screenshot of transaction confirmation in accordance with an embodiment of the present invention. The transaction amount and an authorization number 228 are displayed in the confirmation. As mentioned previously, authorization number 228 may be generated by a transaction server and sent to portable device 202 as confirmation of the credit card transaction. The user may also activate mechanisms for sending a receipt 230 to the customer and voiding the charge 232.

Figure 3:
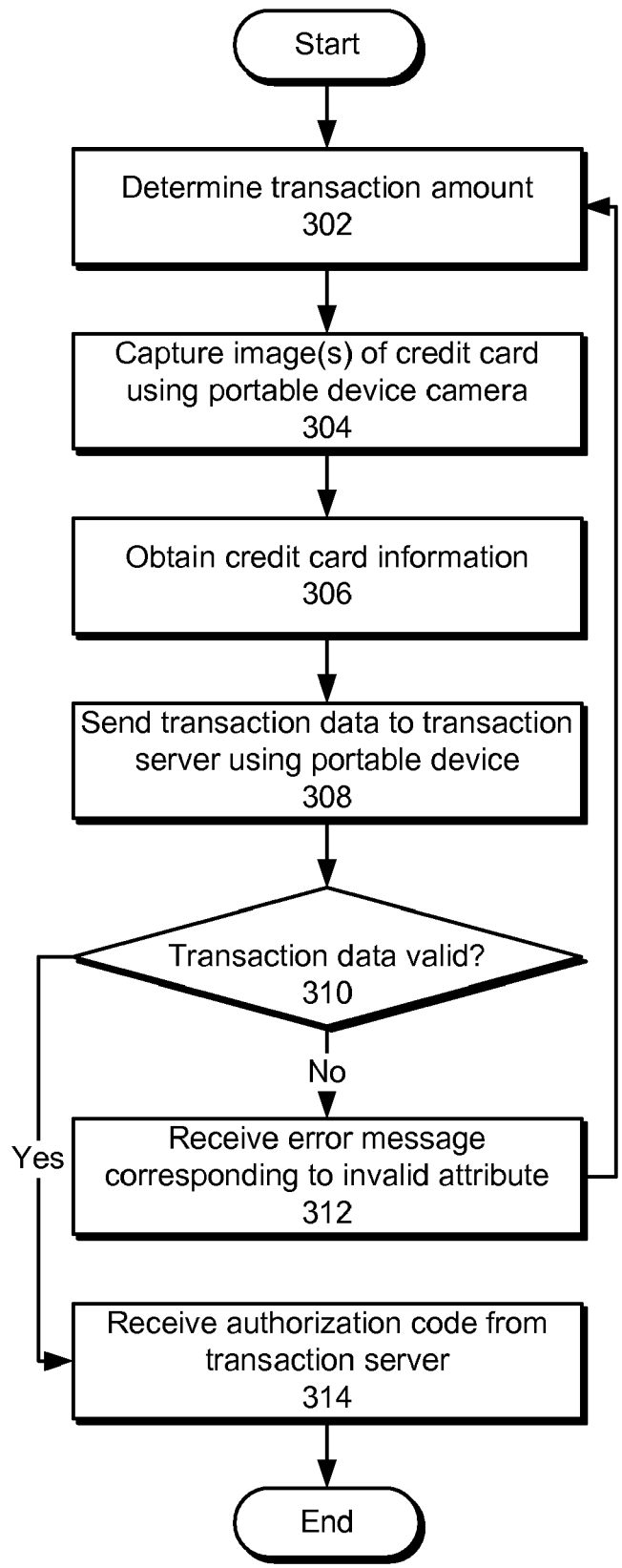
FIGS. 3-4 show flowcharts in accordance with an embodiment of the present invention.

FIG. 3 shows a flowchart of user-side financial transaction processing in accordance with an embodiment of the present invention. In one or more embodiments of the invention, one or more of the steps may be omitted, repeated, and/or performed in a different order. Accordingly, the specific arrangement of steps shown in FIG. 3 should not be construed as limiting the scope of the invention.

Initially, a transaction amount is determined (operation 302). The transaction amount may be negotiated between the merchant and customer or based on a set and/or advertised price of a good or service. The transaction amount may also correspond to a charge or a refund. One or more images of a credit card associated with the transaction are captured using a camera on a portable device (operation 304), such as a mobile phone camera or laptop webcam. The image(s) may include a front and back image of the credit card. In addition, the image(s) may display credit card information on the credit card clearly for subsequent review.

Credit card information is also obtained (operation 306). The credit card information may be entered manually into the portable device and/or extracted from the credit card image(s) using OCR. The credit card information may include a credit card number, an expiration date, a verification number, and optionally, a ZIP or postal code. Next, transaction data containing the transaction amount, credit card image(s), and credit card information is sent to a transaction server using the portable device (operation 308). Specifically, a wireless transceiver on the portable device may be used to transmit the transaction data across one or more networks to the transaction server.

The transaction server may determine a validity of the transaction data (operation 310). The validity may be based on the accuracy of the credit card information, conformity of the credit card image(s) to set guidelines, and/or the validity of the transaction amount (e.g., within credit limits). If the transaction data is not valid, an error message corresponding to an invalid attribute of the financial transaction is received by the portable device. The error message may prompt the user to update the transaction amount, credit card image(s), and/or credit card information and resend the transaction data to the transaction server (operations 302-308) until the transaction data is valid. Once the transaction data is valid, an authorization code confirming the transaction is received from the transaction server (operation 314).

Figure 4:
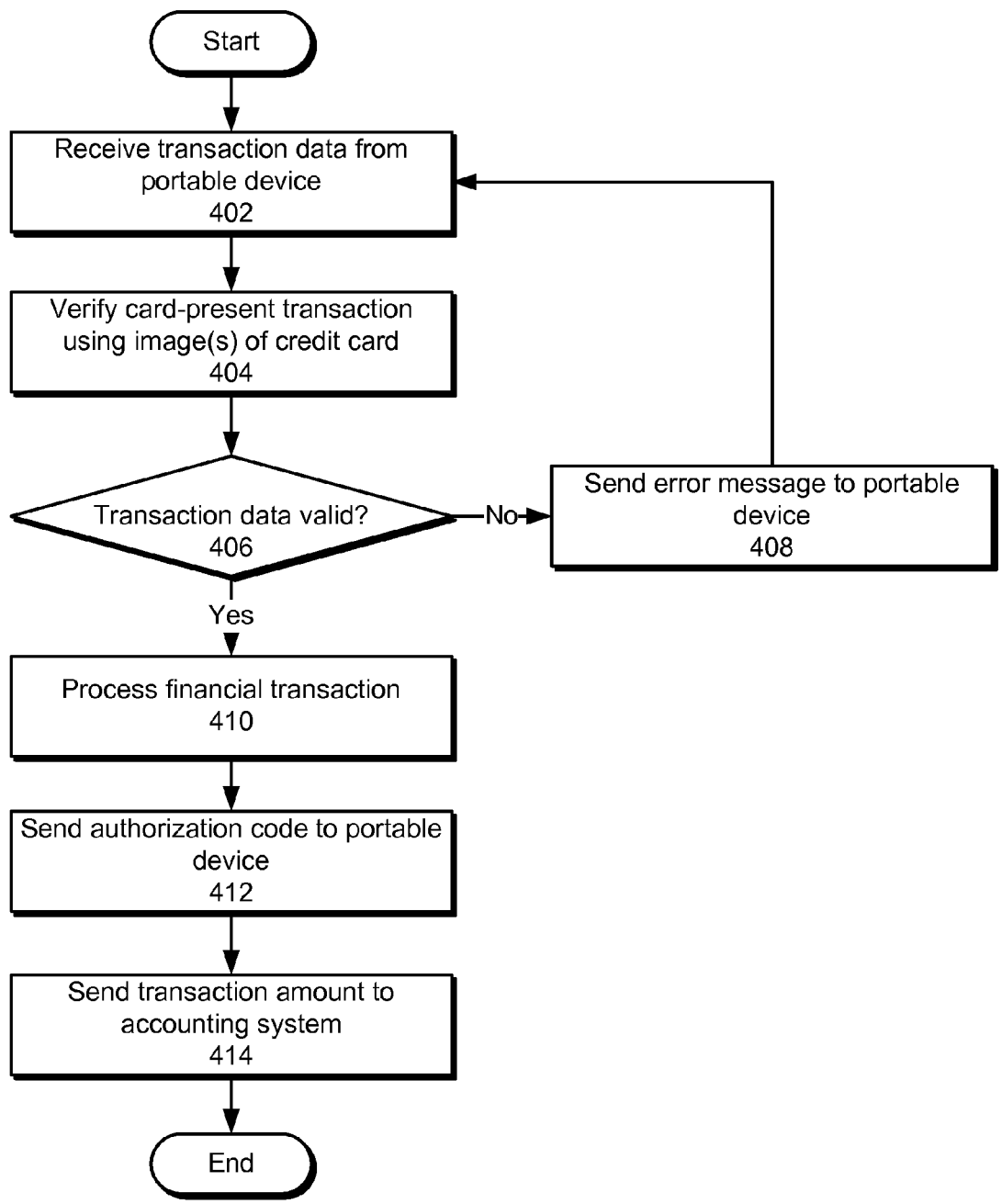

FIG. 4 shows a flowchart of server-side financial transaction processing in accordance with an embodiment of the present invention. In one or more embodiments of the invention, one or more of the steps may be omitted, repeated, and/or performed in a different order. Accordingly, the specific arrangement of steps shown in FIG. 4 should not be construed as limiting the scope of the invention.

Initially, transaction data is received from the portable device (operation 402). As mentioned above, the transaction data includes a transaction amount, credit card information, and one or more images of the credit card associated with the financial transaction. Next, a card-present transaction is verified using the credit card image(s) (operation 404). The credit card image(s) may be examined using one or more image processing techniques for a presence of a credit card at the location of the financial transaction. The image(s) may further be used to determine a validity of the transaction data (operation 406) by comparing OCR-extracted information from the image(s) with the transaction data. The validity of the transaction data may also be based on the validity of the transaction amount, comparison of the credit card information with credit card accounts in a database, and/or conformity of the credit card image(s) to established guidelines.

If the transaction data is invalid, an error message is sent to the portable device (operation 408). The error message may correspond to an invalid attribute of the financial transaction. For example, if an invalid credit card number is found, the error message may contain an error code and the text "invalid credit card number." The error message may prompt the transaction data to be revised and resent from the portable device (operation 402), and a card-present transaction may optionally be re-verified using the new transaction data. The transaction data is examined for validity (operation 406) until the transaction data is valid.

Once the transaction data is valid, the financial transaction is processed (operation 410). The financial transaction may be processed by debiting one account by the transaction amount and crediting another account by the transaction amount minus transaction fees. A record of the financial transaction may also be maintained by the transaction server. Next, an authorization code confirming the transaction is sent to the portable device (operation 412). Similarly, the authorization code, transaction amount, transaction date, and/or other information may be sent to an accounting system (operation 414) for further record-keeping purposes, as described above with respect to FIG. 1.

The foregoing descriptions of embodiments have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for processing a financial transaction, comprising:
    determining a transaction amount of the financial transaction;
    capturing an image of a credit card associated with the financial transaction using a camera on a portable device;
    obtaining credit card information associated with the credit card;
    sending transaction data to a transaction server using the portable device, wherein the transaction data comprises the transaction amount, the image, and the credit card information; and
    if the transaction data is valid:
        receiving an authorization code from the transaction server,
    wherein the authorization code confirms the financial transaction,
    wherein the financial transaction comprises a card-present transaction.

2. The method of claim 1, further comprising:
    if the transaction data is invalid:
        receiving an error message from the transaction server, wherein the error message corresponds to an invalid attribute of the financial transaction.

3. The method of claim 1, further comprising:
    capturing a second image of the credit card using the camera, wherein the transaction data further comprises the second image.

4. The method of claim 3, wherein the image and the second image are selected from a front image and a back image of the credit card.

5. The method of claim 3, wherein the credit card information is obtained by performing optical character recognition (OCR) on the image and the second image.

6. The method of claim 1, wherein the credit card information comprises a credit card number, an expiration date, and a verification number.

7. The method of claim 6, wherein the credit card information further comprises a postal code.

8. A method for processing a financial transaction, comprising:
    receiving transaction data associated with the financial transaction from a portable device, wherein the transaction data comprises:
        a transaction amount;
        a front image of a credit card associated with the financial transaction;
        a back image of the credit card; and
        credit card information associated with the credit card;
    verifying a card-present transaction using the front image and the back image;
    determining a validity of the transaction data; and
    if the transaction data is valid:
        processing the financial transaction using the transaction amount and the credit card information; and
        sending an authorization code to the portable device, wherein the authorization code confirms the financial transaction.

9. The method of claim 8, further comprising:
if the transaction data is invalid:
  sending an error message to the portable device, wherein the error message corresponds to an invalid attribute of the financial transaction.

10. The method of claim 8, further comprising:
sending the transaction amount to an accounting system; and
recording the financial transaction at the accounting system using the transaction amount.

11. The method of claim 8, wherein the transaction amount and credit card information are manually entered into the portable device.

12. The method of claim 8, wherein the credit card information is obtained by performing optical character recognition (OCR) on the front image and the back image.

13. The method of claim 8, wherein the credit card information comprises a credit card number, an expiration date, and a verification number.

14. The method of claim 13, wherein the credit card information further comprises a postal code.

15. A system for processing a financial transaction, comprising:
a portable device, comprising:
  a transaction application configured to:
    determine a transaction amount of the financial transaction; and
    obtain credit card information associated with a credit card associated with the financial transaction;
  a camera configured to capture a front image and a back image of the credit card; and
  a wireless transceiver configured to send transaction data over a network, wherein the transaction data comprises the transaction amount, the front image, the back image, and the credit card information; and
a transaction server, comprising:
  an authentication module configured to:
    receive the transaction data from the portable device using the network;
    verify a card-present transaction using the front image and the back image; and
    determine a validity of the transaction data; and
  an authorization module configured to:
    process the financial transaction based on the validity of the transaction data; and
    generate an authorization code corresponding to the financial transaction.

16. The system of claim 15, further comprising:
an accounting system configured to obtain a record of the financial transaction from the transaction server.

17. The system of claim 15, wherein the transaction amount and credit card information are manually entered into the portable device.

18. The system of claim 15, wherein the credit card information is obtained by performing optical character recognition (OCR) on the front image and the back image.

19. The system of claim 15, wherein the credit card information comprises a credit card number, an expiration date, and a verification number.

20. The system of claim 19, wherein the credit card information further comprises a postal code.

21. A computer-readable storage medium storing instructions that when executed by a computer cause the computer to perform a method for processing a financial transaction, the method comprising:
determining a transaction amount of the financial transaction;
capturing an image of a credit card associated with the financial transaction using a camera on a portable device;
obtaining credit card information associated with the credit card;
sending transaction data to a transaction server using the portable device, wherein the transaction data comprises the transaction amount, the image, and the credit card information; and
if the transaction data is valid:
  receiving an authorization code from the transaction server, wherein the authorization code confirms the financial transaction,
  wherein the financial transaction comprises a card-present transaction.

22. The computer-readable storage medium of claim 21, the method further comprising:
if the transaction data is invalid:
  receiving an error message from the transaction server, wherein the error message corresponds to an invalid attribute of the financial transaction.

23. The computer-readable storage medium of claim 21, the method further comprising:
capturing a second image of the credit card using the camera, wherein the transaction data further comprises the second image.

24. The computer-readable storage medium of claim 23, wherein the image and the second image are selected from a front image and a back image of the credit card.

25. The computer-readable storage medium of claim 23, wherein the credit card information is obtained by performing optical character recognition (OCR) on the image and the second image.

* * * * *